United States Patent [19]

Ishibashi et al.

[11] Patent Number: 4,980,865
[45] Date of Patent: Dec. 25, 1990

[54] ULTRASONIC MICROSCOPE

[75] Inventors: Junichi Ishibashi; Masahiro Aoki, both of Tokyo, Japan

[73] Assignee: Olympus Optical Co., Ltd., Tokyo, Japan

[21] Appl. No.: 390,085

[22] Filed: Aug. 7, 1989

[30] Foreign Application Priority Data

Aug. 19, 1988 [JP] Japan .................... 63-206092

[51] Int. Cl.$^5$ .................... G03B 42/06
[52] U.S. Cl. .................... 367/11; 73/607
[58] Field of Search .................... 367/7, 8, 11; 73/607, 73/620, 634; 364/507; 128/660.09, 660.05

[56] References Cited

U.S. PATENT DOCUMENTS 4,683,751 8/1987 Imade et al. .................... 73/607
4,751,686 6/1988 Uchino et al. .................... 367/7

Primary Examiner—Thomas H. Tarcza
Assistant Examiner—Daniel T. Pihulic
Attorney, Agent, or Firm—Frishauf, Holtz, Goodman & Woodward

[57] ABSTRACT

An ultrasonic microscope comprises an ultrasonic pulse transmitting/receiving circuit for emitting an ultrasonic to a sample and receiving an echo from it, a scanner for scanning the sample in a direction normal to the direction of emitting the ultrasonic pulse, an extraction circuit for sampling the output signal of the ultrasonic pulse transmitting/receiving circuit at a given duration and at given intervals to extract echo data signals of plural depths in the sample, a first memory for storing B mode image data attained by a single scanning, a second memory for storing, as 3D image data, the B mode image data sequentially read out from the first memory, an image processor for reading out the image data from the second memory for image processing, and a display device for displaying the processed image data as a 2D or 3D image.

12 Claims, 8 Drawing Sheets

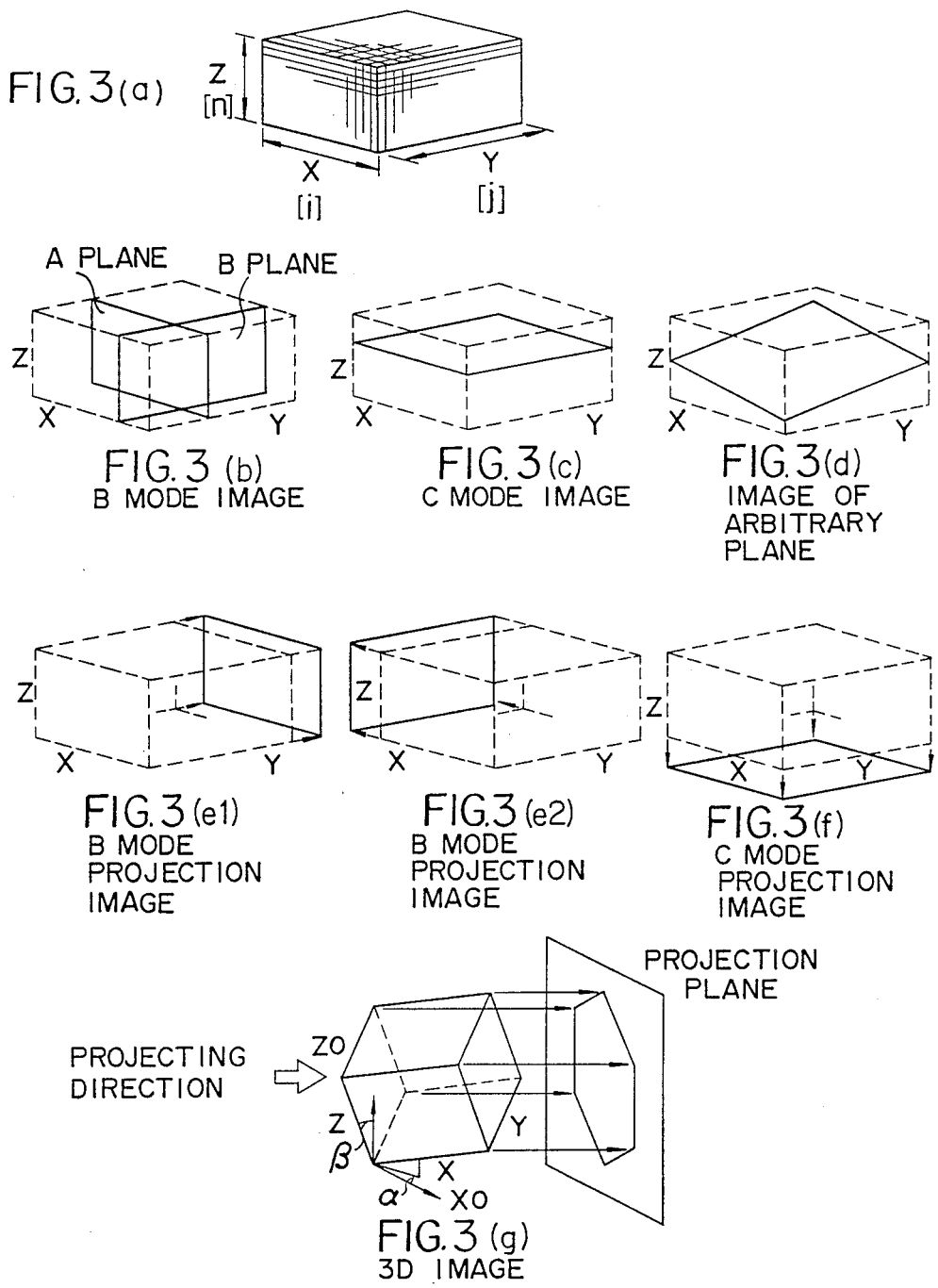

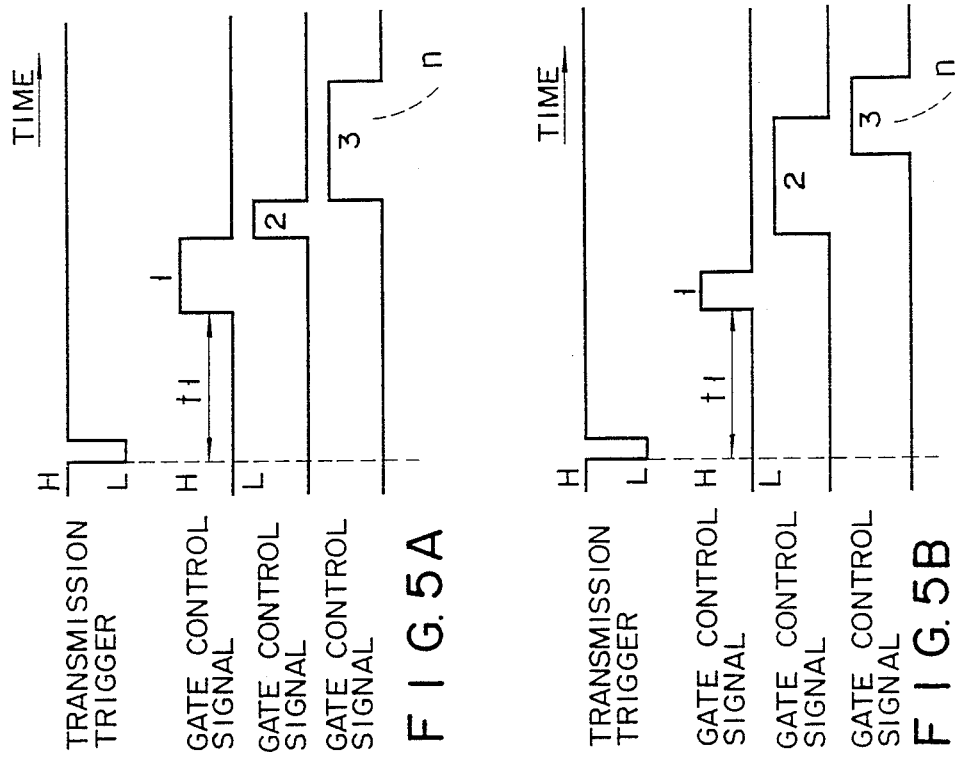
F I G. 5A  F I G. 5B
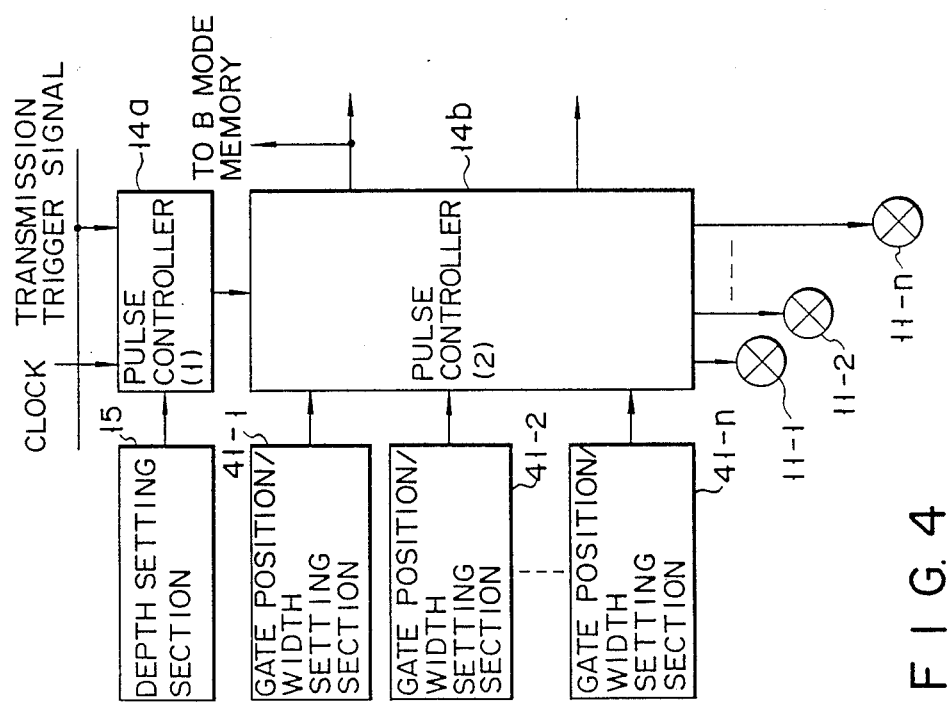
F I G. 4

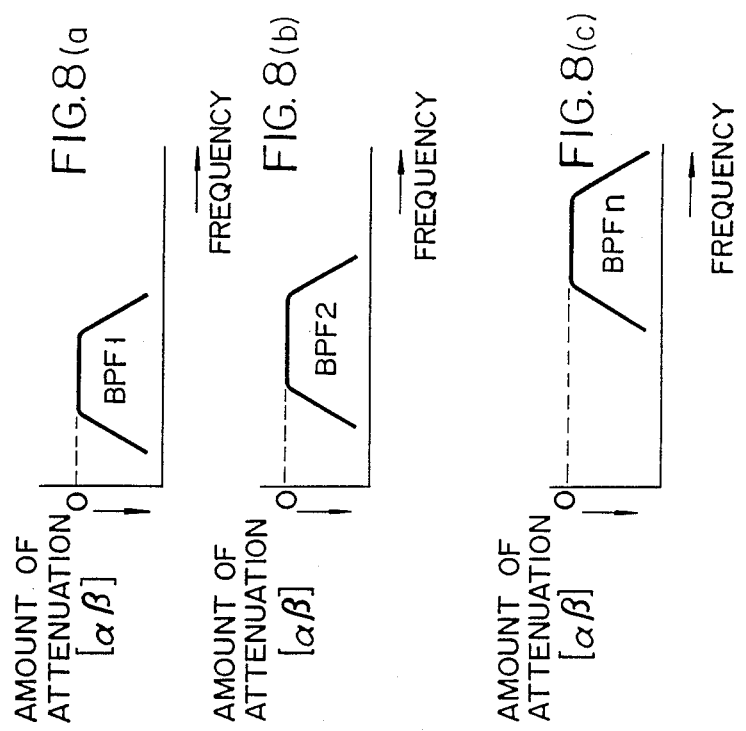
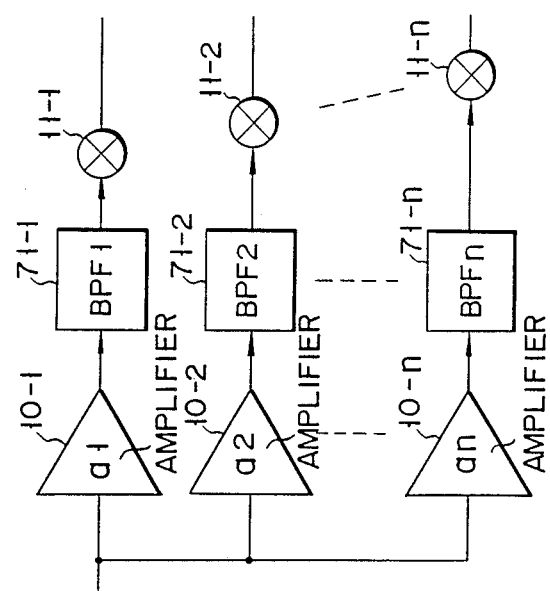

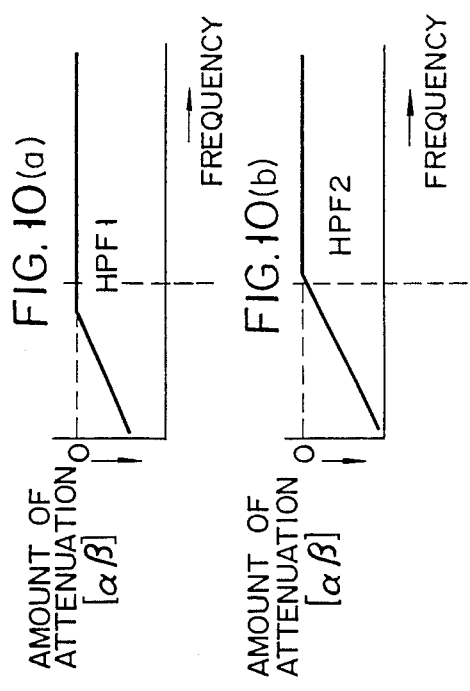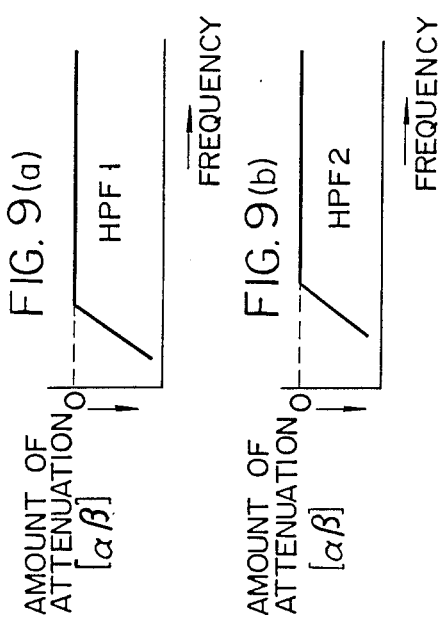

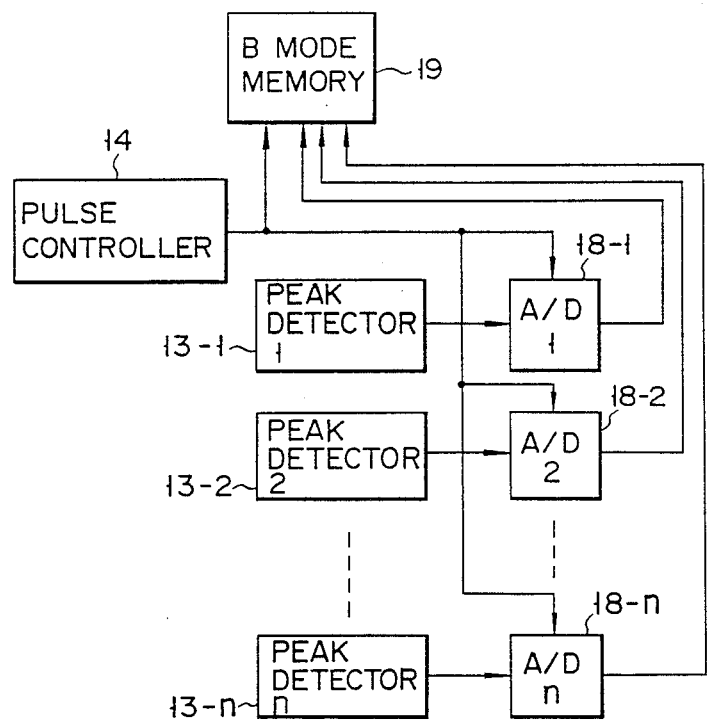
F I G. 11
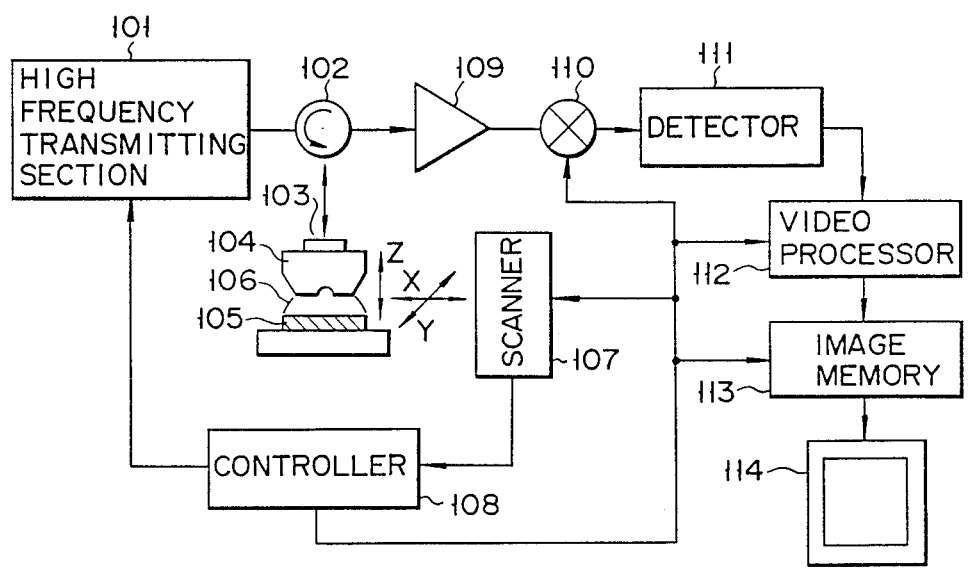
F I G. 12

ULTRASONIC MICROSCOPE

BACKGROUND OF THE INVENTION

1. Field of the Invention

The present invention relates to an ultrasonic microscope which can provide an arbitrary image, such as a B mode image, C mode image or a three-dimensional (3D) image.

2. Description of the Related Art

There is known an ultrasonic microscope which converges an ultrasonic beam into a fine spot, scans a sample with this fine spot with a relative relation between the sample and the spot and processes an echo signal acquired from the sample to thereby observe the internal conditions of the sample.

FIG. 12 exemplifies the structure of a conventional ultrasonic microscope. An ultrasonic burst wave produced from a high frequency transmitting section 101 is applied to a piezo-electric transducer (ultrasonic transducer) 103 through a circulator 102. The transducer 103 converts a high frequency electric signal into an ultrasonic wave. This ultrasonic wave is converted into a convergent spherical wave by an acoustic lens 104 and is converged into a fine spot. The converted spherical wave enters a sample 105 disposed at the proximity of the focusing plane.

The space between the acoustic lens 104 and sample 105 is filled with a coupler liquid which serves to propagate an ultrasonic wave. The ultrasonic pulse incident to the sample 105 undergoes an influence such as reflection, penetration, scattering or absorption. The ultrasonic wave reflected from the sample 105 propagates again through the coupler liquid 106 passes through the acoustic lens 104, then is converted into an electric signal by the piezo-electric transducer 103. The electric signal travels through the circulator 102 to a high frequency amplifier 109 for amplification. The unnecessary signal component of the amplified signal is eliminated by a gate 110, which is controlled by a controller 108. As a result, only the necessary echo signal from the sample 105 is extracted and is led to a detector 111. The detector 111 subjects the echo signal to envelope detection to acquire the intensity of the echo signal. The resultant signal is subjected to signal processing in a video processor 112, then written into an image memory 113.

The above description is concerned with point data of the sample 105. A scanner 107 is provided to acquire two-dimensional (2D) image data. The scanner 107 executes 2D scanning on the sample 105 with an ultrasonic pulse, and data of each point is similarly stored in the image memory 113. In order to confirm or view the internal image of the sample 105, the data needs to be read out from the image memory 113 and displayed on a monitor 114.

The image acquired by this prior art technique is a so-called C mode (or C scope) image. That is, with the emitting direction of an ultrasonic pulse taken on the z axis and two axes normal to the z axis being x and y axes, an image acquired through x-y scanning by the scanner 107 is a 2D image of a plane of the sample 105 parallel to the x-y plane. This mode cannot provide date of different internal portions of the sample at different depths. In order to acquire internal data of a sample at different depths, it is necessary to acquire another C mode image which has undergone z-directional scanning in addition to the x-y scanning to reflect an altered relationship between the sample 105 and the converging position of the ultrasonic pulse. This method complicates the scanning.

An ultrasonic tomographic apparatus is conventionally known to provide a tomographic image of a plane parallel to an emitted ultrasonic pulse, i.e., a B mode (or B scope) image. This type of apparatus cannot however provide a C mode image nor a 3D image.

The aforementioned conventional ultrasonic microscope and tomographic apparatus are both for attaining 2D image data. No apparatuses have been realized at present which provide image data reflecting the acoustic property of a 3D structure. For instance, in order to observe a 3D distribution of defects inside a sample, the shape of a heterogeneous medium or the like, it is desirable that not only one tomographic plane of a sample but also a 3D projection image of the sample be easily acquired.

SUMMARY OF THE INVENTION

Accordingly, it is an object of this invention to provide an ultrasonic microscope which can acquire an image of an arbitrary oblique plane inside a sample and a 3D image thereof as well as B mode and C mode images by combination of a single x-y scanning and electrical signal processing.

An ultrasonic microscope according to the present invention includes a circuit for sampling the output signal of an ultrasonic pulse transmitting/receiving circuit at intervals to extract a plurality of echo data signals in order to acquire data at a plurality of points in the z direction at each position (x, y) from an echo signal from a sample produced by 2D scanning in the x and y directions. Each echo data signal attained by this extraction circuit is converted into a digital signal by an A/D converter. For a given scanning range in the x direction, the output of the A/D converter is stored as B mode image data in a first memory. The ultrasonic microscope also has a second memory for storing, as 3D image data, plural pieces of B mode image data, which have been sequentially stored in the first memory and whose y-directional positions differ from each other. The ultrasonic microscope further includes an image processor for reading out data from the second memory and subjecting it to image processing, and a display play device for displaying a given image which has undergone the image processing.

According to this invention, although a sample is two-dimensionally scanned (in the x and y directions) with an ultrasonic pulse with a relative relation between the sample and this pulse, echo data of the same at a plurality of points in the z direction can be acquired by a combination of the 2D scanning and a signal processing of sampling the output signal of the ultrasonic pulse transmitting/receiving circuit at intervals. In other words, 3D image data of a sample can be attained by a single 2D scanning. By processing the contents of the second memory having stored this 3D image data, it is possible to easily display an image of a given inclined plane or slice inside a sample, a projection image thereof and a 3D image thereof as well as a B mode image and a C mode image.

BRIEF DESCRIPTION OF THE DRAWINGS

FIGS. 3(a)–3(g) are diagrams for explaining various image display modes of the ultrasonic microscope according to the embodiment;

FIG. 4 is a diagram illustrating the arrangement of a pulse controller according to another embodiment;

FIGS. 5A to 5D show timing charts of respective gate control signals according to the FIG. 4 embodiment;

FIG. 7 is a diagram illustrating an embodiment in which a band-pass filter is inserted;

FIGS. 8(a)–8(c) are diagrams illustrating the frequency characteristic distribution of the band-pass filter shown in FIG. 7;

FIGS. 9(a)–9(c) are diagrams illustrating the frequency characteristic of a high-pass filter inserted in place of the band-pass filter shown in FIG. 7;

FIGS. 10(a)–10(c) are diagrams illustrating another frequency characteristic of a high-pass filter;

FIG. 11 is a diagram illustrating a further embodiment employing a plurality of A/D converters; and FIG. 12 is a diagram illustrating the structure of a conventional ultrasonic microscope.

DETAILED DESCRIPTION OF THE PREFERRED EMBODIMENT

Figure 1:
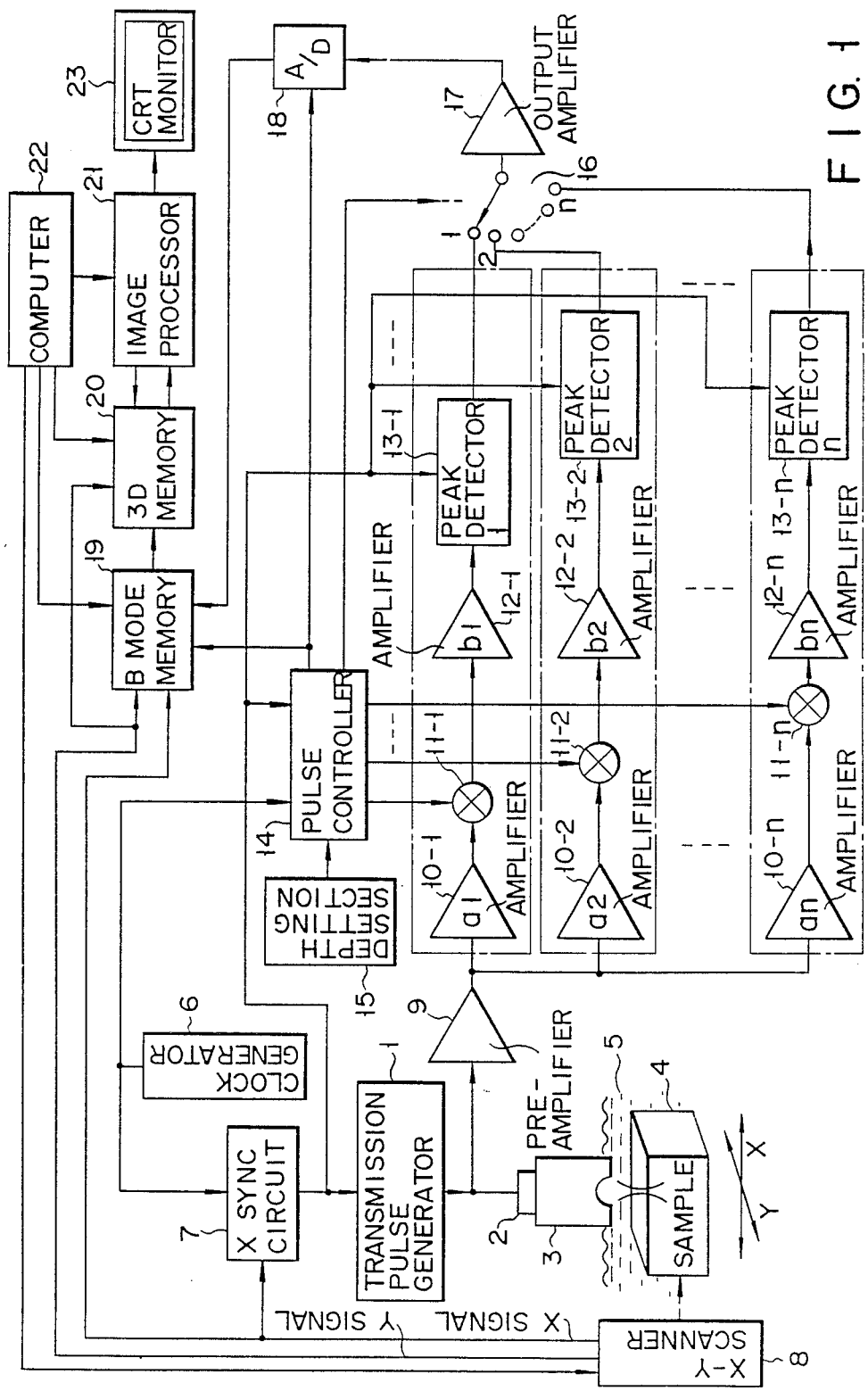
FIG. 1 is a diagram illustrating the structure of an ultrasonic microscope according to one embodiment of the present invention.

FIG. 1 illustrates the structure of an ultrasonic microscope according to one embodiment of the present invention. An ultrasonic pulse transmitting/receiving circuit comprises a transmission pulse generator 1 for generating a high-voltage pulse at given intervals, a piezo-electric transducer (ultrasonic transducer) 2 for generating an ultrasonic pulse upon reception of the high-voltage pulse from the pulse generator 1, and an acoustic lens 3 for converging the ultrasonic pulse from the transducer 2 into a fine spot. A sample 4, a target of observation, is disposed at or near a position where the ultrasonic pulse from the acoustic lens 3 is converged. A space between the sample 4 and the acoustic lens 3 is filled with coupler liquid 5 such as water. An x-y scanner 8 serves to two-dimensionally scan the sample within a plane (x-y plane) formed by two axes x and y normal to the emitting direction (z direction) of an ultrasonic pulse. The scanner 8 is driven by, for example, a step motor. An x sync circuit 7 fetches an output clock of a clock generator 6 based on a sync signal (x signal) for x-directional scanning which is output from the x-y scanner 8, and sends a trigger signal to the transmission pulse generator 1. In turn the transmission pulse generator 1 generates a high-voltage pulse in synchronism with the x-directional scanning.

An echo from the sample 4 passes through the acoustic lens 3 again, and is converted into an electric signal before being input to a pre-amplifier 9. The output signal of the pre-amplifier 9 is supplied to a circuit which samples it to extract echo (acoustic) data signals at a plurality of points along the z direction of the sample 4. According to this embodiment, n amplifiers 10 (10-1, 10-2, ..., 10-n) are coupled in parallel to an output terminal of the pre-amplifier 9. Each of gates 11 (11-1, 11-2, ..., 11-n) and each of amplifiers 12 (12-1, 12-2, ..., 12-n) and each of peak detectors 13 (13-1, 13-2, ..., 13-n) are coupled in series to the associated one of the amplifiers 10. The outputs of the amplifiers 10 are supplied through the respective gates 11 to the respective amplifiers 12 again for amplification. The amplified outputs are then supplied to the respective peak detectors 13. A pulse controller 14, which may be constituted by a counter, is reset by a transmission trigger signal and outputs a gate control signal after a given time to sequentially enable the gates 11. The gate control signal is control pulses having a constant pulse width but with slightly shifted timings, and is generated by the x sync circuit 7 in synchronism with the x-y scanning. Acoustic data signals at a plurality of points along the z direction of the sample 4 can be sampled from the echo from the sample 4 using this gate control signal. A depth setting section 15 externally sets a timing at which generation of the control pulse from the pulse controller 14 starts, i.e., at a timing at which the gates 11 start being enabled. This depth setting section 15 permits only the acoustic data within a given depth range in the sample 4 to be fetched as data. Each peak detector 13 subjects a sampled echo signal at each depth to envelope detention. The peak detectors 13 detect and hold the peak values of the attained acoustic data signals. The trigger signal from the x sync circuit 7 is supplied as a reset signal to the peak detectors 13. In other words, a received echo signal is sampled and held for each coordinate position of the x directional scanning.

The output signal of each peak detector 13 is sequentially fetched and led to an output amplifier 17 as a time-series signal by an analog switch 16 which is controlled by the pulse controller 14. The output of this output amplifier 17 is sequentially converted into a digital signal by an A/D converter 18 which is also controlled by the pulse controller 14. The A/D-converted echo signal is sequentially written in a first memory (B mode memory) 19. This memory 19 stores B mode images at i points in the x direction and at n points in the z direction for each step in the y scanning in the x-y scanning under the control of the x-y scanner 8 and pulse controller 14. Data stored in the B mode memory 19 is transferred to and stored in a second memory (3D memory) 20 for each step in the y scanning. Given that there are j points in the y scanning, a total of $n \times i \times j$ pieces of 3D image data of the sample 4 are stored in the 3D memory 20.

An image processor 21 properly fetches data from the 3D memory 20 based on a command from a computer 22 and processes it to construct the desired image. The thus constructed image will be displayed on a CRT monitor 23 for visual confirmation.

Figure 2:
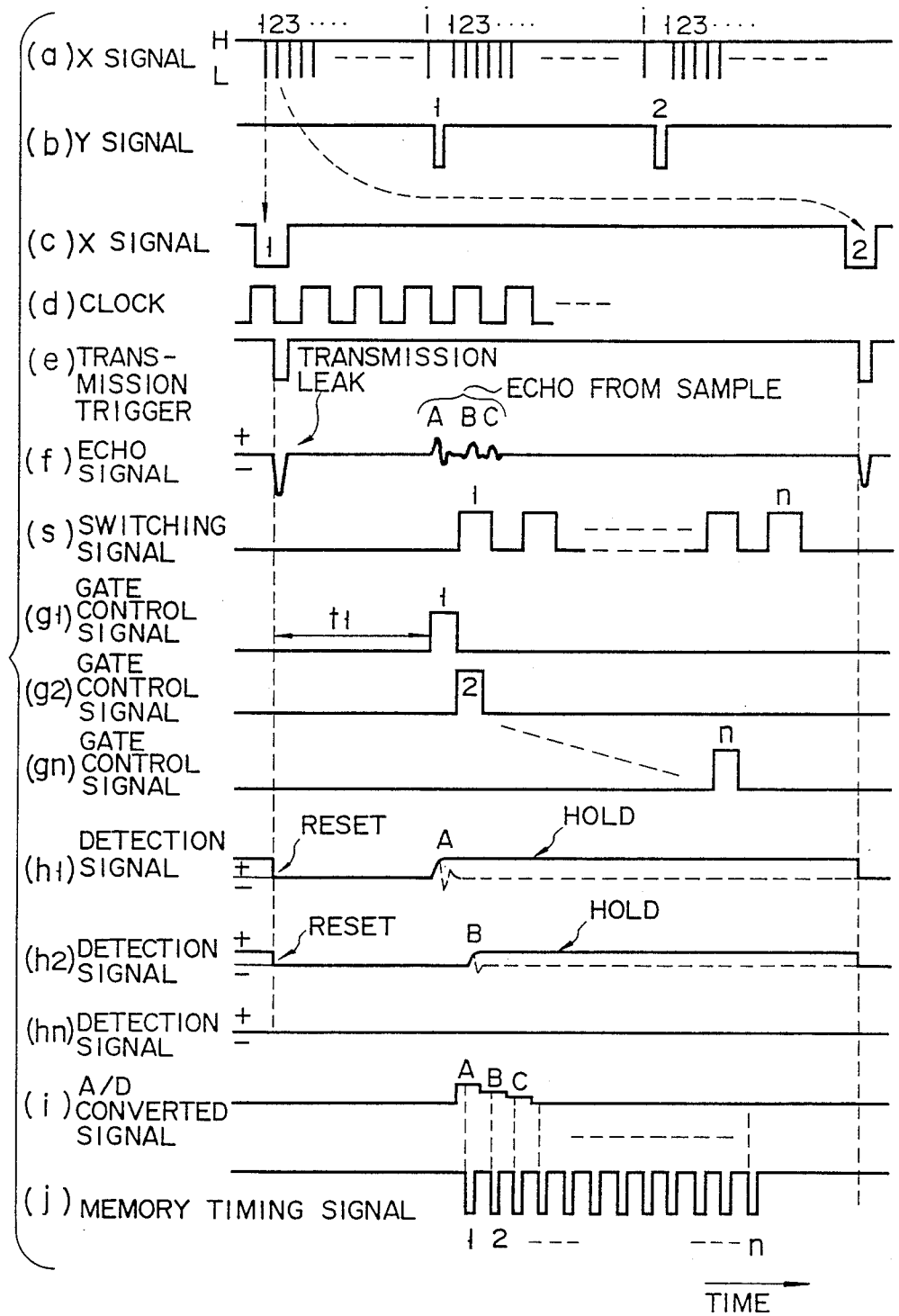
FIG. 2 is a timing chart showing signals for explaining the operation of the ultrasonic microscope according to the embodiment.

FIG. 2 is a timing chart for explaining the operation of the ultrasonic microscope with the above structure. The operation of the ultrasonic microscope will be described below referring to this timing chart. At the start of a scanning operation, the first and second memories 19 and 20 are cleared and the x-y scanner 8 is driven for x-Y scanning by a command signal from the computer 22. At this time, the x-y scanner 8 outputs an x signal and a y signal with the time relation as illustrated by signals (a) and (b) in FIG. 2. The sample 4 is scanned in the x direction relative to the ultrasonic wave source with the x signal (from 1 to i). Upon completion of the x scanning, the sample 4 is moved by one step in the y direction by the y signal and the same x scanning is repeated there. The signals (c) and the following signals in FIG. 2 illustrate operational waveforms of a signal processing in a single x scanning with the time axis of the x signal being magnified. First, the x signal and the clock signal (d) from the clock generator 6 are input to the x sync circuit 7, causing a transmission trigger signal (e) synchronous with the x signal to be input to the transmission pulse generator 1. This permits the generator 1 to produce a high-voltage pulse which will excite the piezoelectric transducer 2 to generate an ultrasonic pulse.

The echo from the sample 4 is converted into an electric signal by the transducer 2 and is fetched out (see signal (f) in FIG. 2. Referring to said signal (f), the negative pulse attained in synchronism with the transmission trigger is a transmission leak and is not originated from the echo. As illustrated, an echo signal originated from the echo from the sample 4 is acquired upon elapse of a given time from the transmission pulse. A time $t_1$ with the time for the echo to reach the transducer 2 taken into account is set by the depth setting section 15. The pulse controller 14 sequentially outputs the gate control signals (g1) to g(n) of FIG. 2 starting from a point delayed by time $t_1$ from the time of reception of the transmission trigger signal. These gate control signals cause the n gates 11 to be sequentially enabled so that the echo signal is sampled. As shown by signals (h1) to (hn), the peak intensity is extracted from the echo signal and held by the peak detectors 13, which are reset by the transmission trigger from the x sync circuit 7. The output signals of the peak detectors 13 are fetched as a time-series signal as shown in FIG. 2(i) by a switching signal (S), which changes over the analog switch 16 at the same timing as the gate control signal is produced. The time-series signal is then input to the A/D converter 18. Since there is a delay in the peak detectors 13, the portion A of the detection signal ($h_1$) held by the pulse "1" of the gate control signal ($g_1$) is output to the A/D converter 18 by the pulse "2" of the gate control signal ($g_2$). The A/D converter 18 performs A/D conversion of the received signals at timings respectively delayed by $\Delta T$, as shown by signal (j). This image data associated with the depth direction is written in the B mode memory 19 at the same timing as the A/D conversion is performed. A single emission of an ultrasonic pulse can provide acoustic data of n points in the z direction or n different depths of the sample 4. B mode image data acquired by the scannings of x=1 to i is sequentially written in the B mode memory 19 with its address set by the x signal. When the B mode image data stored in the memory 19 is transferred to the 3D memory 20, it is erased. The same scanning is executed for every point of y=1 to j, and B mode images at the individual y coordinates are sequentially transferred to the 3D memory 20 and stored there as 3D image data.

Writing of the B mode image data in the B mode memory 19 and transferring of this data therefrom to the 3D memory 20 may be executed simultaneously. For instance, a plurality of memory areas may be formed in the B mode memory 19 so that B mode image data associated with plural steps of the y scanning can be stored step by step in the associated memory areas. The B mode image data attained by the x scanning is written in the memory 19 and this data is reset every time the y signal is output. B mode image data for several steps is written in this manner. When writing of the B mode image data for several steps is completed, the data is transferred to the 3D memory 30 and B mode image data newly attained by the x scanning is written in another memory area.

A description will now be given of how to acquire various images by processing the written 3D data referring to FIG. 3(a) to 3(g). FIG. 3(a) illustrates that data stored in the 3D memory 20 is arranged in a virtual 3D space. If 3D data with addresses (I, J, N) corresponding to the spatial coordinates (x, y, z) is arranged as illustrated, it is easy to control data transfer to the image processor 21. If the 3D memory 20 is not structured to cope with such x-y-z coordinates, an address table should be prepared by hardware or software conversion between the computer 22 and the image processor 21 should be executed.

To display a B mode image, data of the A plane in FIG. 3(b) attained by the x-y scanning needs to be fetched in the image processor 21, and its output data should be displayed on the CRT monitor 23. In this case, with the address (I, J, N), data is read out by specifying:

$I = 1$ to $i$, $J =$ any one of 1 to $j$, and $N = 1$ to $n$ by the computer 22. A 2D image memory is provided as a buffer memory in the image processor 21 in order to attain a plane image with varying densities on the CRT monitor 23. A plane image with a variation in density can be displayed on the CRT monitor 23 by transferring data to this 2D image memory.

This B mode image may be displayed before the x-y scanning is completed. Upon completion of x-scanning at a given y point, B mode image data attained by this x scanning is transferred to the 3D memory 20. The address of this B mode image is specified by the computer 22, and is processed by the image processor 21. The processed data is then displayed on the CRT monitor 23. In this manner, a B mode image just previously fetched can be displayed.

For a B mode image, only the A plane in FIG. 3(b) is generally considered; however, a B mode image for the B plane can be similarly displayed. The address (I, J, N) for this case may be given by specifying:

$I =$ any of 1 to $i$, $J = 1$ to $j$, and $N = 1$ to $n$.

To form a C mode image, only data at a given depth (time) is used as shown in FIG. 3(c). Data should be fetched with its address (I, J, N) being given by specifying:

$I = 1$ to $i$, $J = 1$ to $j$, and $N =$ any of 1 to $n$.

In order to form an image of a given inclined plane as shown in FIG. 3(d), the address (I, J, N) should be specified on the basis of a certain equation associated with that inclined plane. The image can be easily displayed on the CRT monitor 23 by fetching the specified data to the image processor 21 and then sending the processed data to the monitor.

A projection image of a B mode image as shown in FIG. 3(e1) or 3(e2), is formed by adding up plural frames of B mode image data of the A plane or B plane. The same applies to a projection image of a C mode image shown in FIG. 3(f).

In order to provide a projection image in a direction not parallel to any of x, y and z axes as shown in FIG. 3(g), coordinate conversion is necessary. For instance, if a projection plane is parallel to the z-x plane, a process is carried out to rotate the x and z axes of the 3D memory coordinates by $\alpha$ and $\beta$, respectively to convert the coordinates into the coordinates on the projection plane. The other processes are the same as those in the previous example; plural frames of image data are added up to form a 3D projection image in the projecting direction with the desired angle as illustrated.

The ultrasonic microscope of this embodiment acquires 3D image data by executing a 2D scanning and sampling of an echo signal. The attained 3D image data is stored in the 3D memory 20, and through the necessary image processing, an image of a slice with an arbitrary inclination or a 3D projection image as well as a B mode image or C mode image can be formed and displayed on the CRT monitor. In other words, the ultrasonic microscope can provide a microscope not attainable by the prior art, and can be therefore effectively used to observe the distribution of 3D defects inside a sample, and to specify the shape of a heterogeneous medium or the like. With the conventional arrangement, 3D image data can be collected in principle by repeating the x-y scanning plural times, for example. According to this embodiment, however, only one x-y scanning is involved, thus providing 3D image data at a high speed without complicating the scanning operation.

Another embodiment of the present invention will be described below.

FIG. 4 illustrates an embodiment in which the pulse controller 14 used in the first embodiment shown in FIG. 1 is modified. This controller is constituted by two stages of pulse controllers. The first stage pulse controller 14a is constituted by a counter, and is coupled with the depth setting section 15. The time at which fetching of an echo signal starts (see $t_1$, signal (g1), in FIG. 2) is set by this depth setting section 15. The pulse controller 14a at the first stage starts counting the time at the same time it receives a transmission trigger signal, and starts supplying a clock to the second stage pulse controller 14b upon elapse of the set time. The pulse controller 14b is constituted by multivibrators provided in association with each of gates 11. The multivibrators are coupled with gate position/width setting sections 41-1 to 41-n. Upon reception of a clock from the first stage pulse controller 14a, the pulse controller 14b permits the individual multivibrators to sequentially output a gate control signal to the respective gates 11. The gate position and pulse width for each multivibrator is set in advance by the gate position/width setting section 41.

Figure 5C:
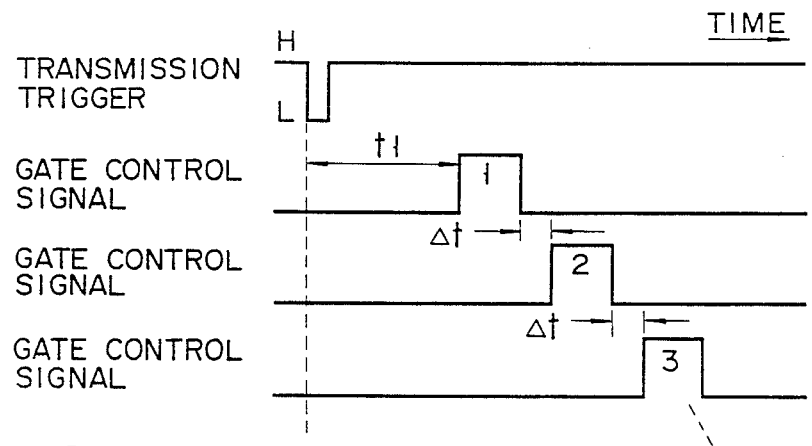
Figure 5D:
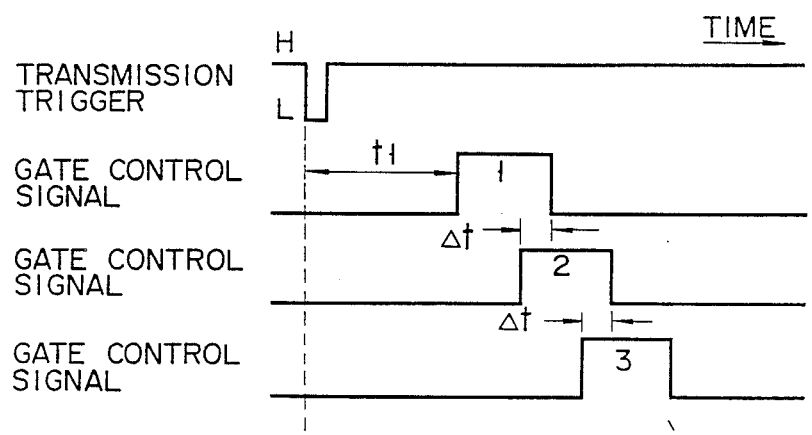

FIGS. 5A to 5D illustrate some examples of specific combinations of the position and width of the gate control signal, in other words the duration and intervals of the sampling. In FIG. 5A, the width of the gate control signal varies as required while maintaining the condition that at the trailing edge of one gate control signal, the next gate control signal rises. In FIG. 5B, there is a slight time delay between the trailing edge of the first gate control signal and the leading edge of the second one and the third gate control signal partially overlaps the second one. In FIG. 5C, a constant delay $\Delta t$ is given between the adjacent signals while their pulse widths are the same. FIG. 5D illustrates a case wherein the individual gate control signals have the same pulse width and overlap one upon another by $\Delta t$. The gate position/width control as illustrated in FIGS. 5A and 5B is particularly effective if defects existing within a sample or the positions of heterogeneous media are not equidistantly located and it is necessary to effectively collect the data. There may be a case where sound speed varies at different portions in a sample and the time for propagation of an ultrasonic wave varies accordingly, thus causing inconsistency in distance between the actual distance in the sample and the distance on an image. The mentioned gate position/width control is also effective in such a case in providing an undistorted image reflecting the actual distance.

If the position/width of a gate control signal is changed, it is necessary to vary the timing or width of a control signal to the analog switch and the A/D converter.

Figure 6:
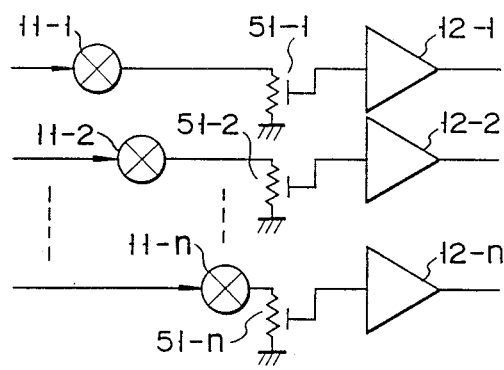
FIG. 6 is a diagram illustrating an embodiment in which a variable attenuator is inserted.

FIG. 6 illustrates an embodiment where variable attenuators 51 (51-1, 51-2, . . . , 51-n) are provided between the respective gates 11 and amplifiers 12 in the embodiment shown in FIG. 1. The gain in each path can therefore be adjusted by the attenuators 51. For instance, an echo from a deep section of a sample generally shows a large attenuation. According to this embodiment, the gains of the individual paths differ from one another, so that a high contrast can be given to an image of a deep section as well as to that of a shallow section.

The positions of the variable attenuators 51 are not restricted to those shown in FIG. 6; the attenuators 51 may be provided anywhere between the amplifiers 10 and the analog switch 16. If the amplifiers themselves are of a variable gain type, the same gain control is possible without particularly providing such attenuators.

FIG. 7 illustrates an embodiment in which band-pass filters 71 (71-1, 71-2, . . . , 71-n) are provided between the amplifiers 10 and the gates 11 in the embodiment shown in FIG. 1. The frequency characteristics of the filters 71 are set in such a way that the middle frequencies sequentially increase for the n gates as shown in FIGS. 8(a)–8(c). In extracting an echo signal from the inside of a sample, in general, a high frequency component of the echo signal from the deepest position has the greatest amplitude attenuation. That is, the frequency spectrum of the attached echo signal differs depending of the depth in the sample. Accordingly, the bearing resolution at a deeper point generally gets lower. Provision of the above band-pass filters 71 can compensate for a change in frequency spectrum, thus keeping the bearing resolution at a deep point substantially at the same level as the one at a shallow point.

Alternately, high-pass filters having the frequency characteristics as shown in FIGS. 9(a)–9(c) or 10(a)–10(c) may be used in place of the band-pass filters with the same effect as the one produced by the previous example. If the attenuation range of the filters as shown in FIGS. 10(a)–10(c) is set at the proximity of the operation frequency of the ultrasonic transducer, the echo frequency spectrum may be effectively compensated.

The aforementioned filters may be located anywhere between the amplifiers and the peak detectors 13.

FIG. 11 illustrates a modification having n A/D converters 18 in place of the analog switch 16 in the embodiment shown in FIG. 1. In this example, the outputs of the peak detectors 13 are converted into digital signals simultaneously and in parallel by the A/D converters 18. With the arrangement of this example, an operation of detecting and recording an acoustic data signal in each depth can be performed at a significantly short time. The ultrasonic microscope therefore has a high processing speed.

The present invention can be modified in various ways without departing from the scope and spirit of the invention. For instance, although the sample 4 is mechanically driven in the x-y scanning in the embodiment in FIG. 1, the ultrasonic wave source may be driven instead since the x-y scanning of the sample is done relative to the ultrasonic wave source. If a high resolution is not required, a plurality of piezoelectric transducers may be arranged two-dimensionally to electrically perform the x-y scanning of a sample. The present invention is of course effective in such a case.

Although in the embodiments, a plurality of gates are used to attain data at different depths from the output signal from the ultrasonic transmitting/receiving circuit, another circuit configuration may be employed so that the received echo signal is sampled at intervals and the peak values are held and extracted.

What is claimed is:

1. An ultrasonic microscope comprising:
   ultrasonic pulse transmitting/receiving means for emitting an ultrasonic wave converged into a fine spot onto a sample, for receiving an echo from said sample and for producing an output signal;
   scanning means for scanning said sample with said ultrasonic wave within an x-y plane with a relative relation between said sample and said ultrasonic wave, the direction of emission of said ultrasonic wave to said sample being a z axis, and two axes normal to said z axis being x and y axes;
   extraction means for sampling each of said output signals of said ultrasonic pulse transmitting/receiving means at a given duration and at given intervals, to extract from said each output signal a plurality of echo data items corresponding to a plurality of different points within said sample, in the direction of the z axis;
   A/D converting means for converting said echo data items from said extraction means into digital signals;
   memory means for storing, as a frame of B mode image data, the digital signals which are supplied from said A/D converting means and obtained within a given scanning range in the x direction, said memory means storing, as a plurality of frames of B mode image data, the digital signals obtained within a plurality of scanning ranges corresponding to a plurality of different positions in the y direction;
   image processing means for reading out data from said memory means and for processing the data to output predetermined image data; and
   display means for displaying as an image said predetermined image data from said image processing means.

2. An ultrasonic microscope comprising:
   ultrasonic pulse transmitting/receiving means for emitting an ultrasonic wave converged into a fine spot onto a sample, for receiving an echo from said sample and for producing an output signal;
   scanning means for scanning said sample with said ultrasonic wave within an x-y plane with a relative relation between said sample and said ultrasonic wave, with a direction of omission of said ultrasonic wave to said sample being a z axis and two axes normal to said z axis being x and y axes;
   extraction means for sampling said output signal of said ultrasonic pulse transmitting/receiving means at a given duration and at given intervals to extract a plurality of echo data signals corresponding to plural different points of said sample from said output signal;
   A/D converting means for converting said echo data signals from said extraction means into digital signals;
   first memory means for storing an output of said A/D converting means within a given scanning range in said x direction, as B mode image data;
   second memory means for storing, as 3D image data, those plural pieces of B mode image data which are sequentially read out from said first memory means and correspond to different positions along said y direction;
   image processing means for reading out data from said second memory means and outputting predetermined image data; and
   display means for displaying said predetermined image data from said image processing means as an image.

3. An ultrasonic microscope according to claim 1, wherein said ultrasonic pulse transmitting/receiving means includes:
   a transmission pulse generator for generating a high-voltage pulse at given intervals;
   an ultrasonic transducer for producing the ultrasonic wave upon reception of said high-voltage pulse from said pulse generator; and
   an acoustic lens for converging the ultrasonic wave from said ultrasonic transducer into a fine spot.

4. An ultrasonic microscope according to claim 3, wherein said ultrasonic pulse transmitting/receiving means further includes an ultrasonic transducer having an output terminal and converting an echo from said sample into an electric signal, and
   wherein said extraction means includes:
   a plurality of gates coupled in parallel to said output terminal of said ultrasonic transducer for selectively sampling the echo data signals;
   pulse generating means for supplying a gate control signal to said gates to sequentially enable said gates; and
   a plurality of peak detectors, coupled to said gates, respectively, for holding peak values of said acoustic data signals sampled by said gates.

5. An ultrasonic microscope according to claim 2, wherein said second memory include means for storing the B mode image data transferred from said first memory in association with spatial coordinates of said sample.

6. An ultrasonic microscope according to claim 4, wherein said pulse generating means comprises first means for setting a fetch start time for said echo data signals, and second means for setting a sampling duration for said echo data signals and sampling intervals for said echo data signals.

7. An ultrasonic microscope according to claim 4, wherein said extraction means includes a plurality of variable attenuators each controlling a gain of each of said echo data signals sampled by said gates.

8. An ultrasonic microscope according to claim 7, wherein each of said variable attenuators is provided between each said gates and each of said peak detectors.

9. An ultrasonic microscope according to claim 4, wherein said extraction means includes band-pass filters provided at input stages of said peak detectors, respectively.

10. An ultrasonic microscope according to claim 9, wherein said band-pass filters have middle frequencies set to differ from one another.

11. An ultrasonic microscope according to claim 4, wherein said extraction means includes high-pass filters provided at input stages of said peak detectors, respectively, and each having a predetermined filter attenuation range.

12. An ultrasonic microscope according to claim 11, wherein the filter attenuation range of each of said high-pass filters is set at a proximity of an operation frequency of said ultrasonic transducer.

* * * * *